Figure 1:
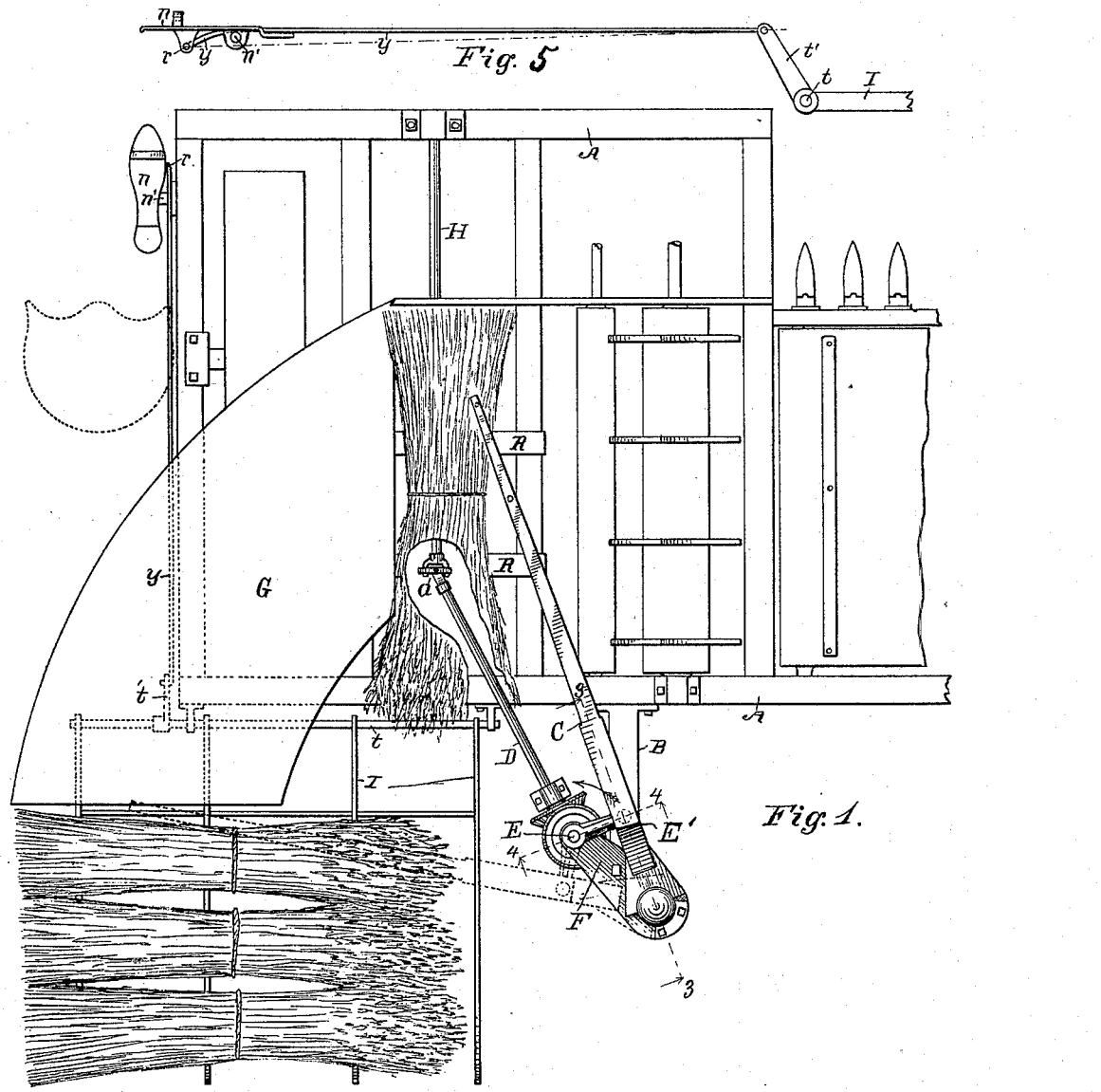

(No Model.) 2 Sheets—Sheet 1.

T. WELCH.
SELF BINDING HARVESTER.

No. 540,287. Patented June 4, 1895.

(No Model.) 2 Sheets—Sheet 2.
T. WELCH.
SELF BINDING HARVESTER.
No. 540,287. Patented June 4, 1895.
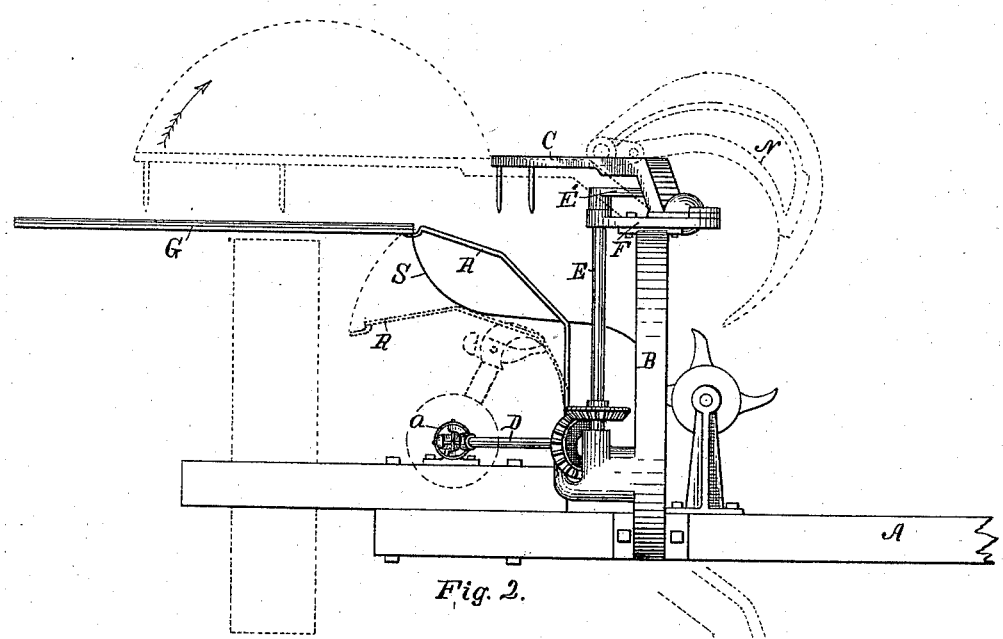
Fig. 2.
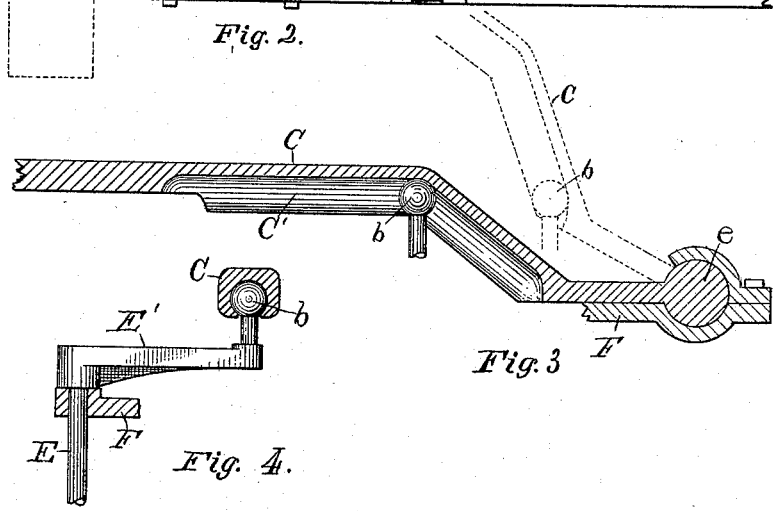
Fig. 3.
Fig. 4.
Witnesses: 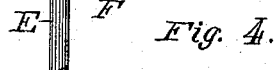
Inventor.
Thomas Welch
By Fred L. Chappell
Att'y.

UNITED STATES PATENT OFFICE.

THOMAS WELCH, OF PAW PAW, MICHIGAN.

SELF-BINDING HARVESTER.

SPECIFICATION forming part of Letters Patent No. 540,287, dated June 4, 1895.

Application filed February 24, 1894. Serial No. 501,372. (No model.)

*To all whom it may concern:*

Be it known that I, THOMAS WELCH, a citizen of the United States, residing at the village of Paw Paw, in the county of Van Buren and State of Michigan, have invented certain new and useful Improvements in Self-Binding Harvesters, of which the following is a specification.

My invention relates to harvesting machines, especially to the twine binding machines which do not elevate the grain after it is cut to bind it, but bind it on nearly the same level to which it falls upon the apron when it is cut by the knife. The great difficulty heretofore with this class of machines has been that the bundles, after they are bound, not having a considerable distance to fall do not separate readily from the unbound grain that is in the machine being bound.

The objects of my invention are to provide an improved self binding harvesting machine which shall perfectly separate the bound grain from the unbound grain in the machine so that there will be no clogging of the binding mechanism or of the machine generally from this cause.

A further object of my invention is to construct one of these so called "low down binders" so that a bundle carrier can be utilized upon it.

I accomplish the objects of my invention by the mechanism shown in the accompanying drawings, in which—

Figure 1 is a top plan view of a portion of a harvesting-machine, showing my improved separating and bundle-discharging device in position, nearly all of the remaining mechanism being taken away. Fig. 2 is an end elevation of Fig. 1 with the bundle-carrier removed and the position of the binding-needle N indicated by dotted lines. Fig. 3 is an enlarged detail sectional view on line 3 3 of Fig. 1. Fig. 4 is an enlarged sectional view on line 4 4 of Fig. 1. Fig. 5 is a detail of the operating mechanism for the bundle-carrier.

Similar letters of reference refer to similar parts throughout the several views.

In the drawings, A represents the main frame of a harvesting machine on which all of the remaining parts are located.

C represents the swinging rake arm which engages the bundle to separate it and carry it over the platform, G, and discharge it to the bundle carrier, I, or to the ground. This arm, or rake, is supported by a bracket, B, attached to the main frame and extending rearwardly. The rear end of the arm, C, is formed into a ball, e, which fits into a socket at the rear end of the bracket, B.

F, is a plate projecting to one side from the bracket, B, and containing at its outer end a bearing for the vertical shaft, E. At the top of the shaft, E, is a crank, E', terminating in the ball, b, which moves in the cam, C', on the under side of the arm, C, to actuate it.

The shaft, E, is connected by a miter gear to shaft, D, which connects by universal joint, a, to the shaft, H. The universal joint, a, is employed to give the proper location to the rear of the machine to one side for attaching the rear of rake arm, C. This is so that the rake arm, C, will have sufficient room to operate and swing, with the bundle grasped by it, clear of other parts and of the driver on his seat. This shaft, H, is the same shaft which actuates the knotting and binding mechanism and commonly called the knotter cam shaft. This shaft, H, (or one similar to it) is in all of this class of machines, and is adapted to actuate the binding mechanism whenever there is a bundle ready to be bound, and as this is the same time when my improved separating and bundle discharging device operates, it will be clear that this shaft will answer the purpose and actuate my improved separating and bundle discharging device by merely connecting the same to it.

As will be seen in Fig. 1, the arm of my improved separating and bundle discharging device is in the starting position just engaging the bundle that has already been bound. When the binding mechanism starts, the shaft will be rotated, which will act through the universal joint, a, on the shaft, D, which will actuate through the miter gear on shaft, E, which will rotate the crank, E', with its ball, b, in cam, C', on the under side of the arm, C, which will first carry the ball, b, out through the horizontal portion of the cam, which will swing the arm, or rake C, horizontally around over the platform, G, separating the bundle and carrying it till it comes to the end of the platform, G, and discharge the bundle on to the bundle carrier, I, or onto the ground, when the ball, b, will start into the inclined part of the cam, C', moving toward the ball, e, which will raise the arm, C, up and at the same time carry it back, as indicated by dotted line in Fig. 2, and also bring it down at the starting point to engage the bundle just bound ready to start again when the shaft of the knotter cam and needle starts. The rear end of the rake arm, C, near the ball, e, is broad and flat to guide the arm, C, and prevent twisting and hold the rake teeth firm. It will thus be seen that the arm, or rake, C, accomplishes this movement and its motion perfectly making one evolution during the binding of each bundle and taking the last bundle bound away as soon as the binding mechanism starts, and so separates it from the unbound grain and discharges it. To assist this arm, C, to more perfectly accomplish its result, I provide springs, or other arms, as R, which project up through the concave binding deck, S, which is adapted to receive and hold the bundle while it is being bound. The springs, or arms, R, as soon as the bundle is bound, lift the bundle up to the proper level to be carried freely along over the platform.

To the rear of the machine and back of the platform, G, is located a bundle carrier, I, which consists of a series of parallel arms or fingers attached to the rock shaft, t, which is operated by the arm, t', which is connected by the connecting rod, y, to the pivot, r, on the tread, n. The tread, n, is pivoted at n', and is located in the proper position to receive the foot of the driver so that he can operate the bundle carrier at will. To operate the bundle carrier, the tread, n, to the bundle carrier is raised up, when the pivot, r, will pass by the center of support, n', and allow the fingers of the bundle carrier to drop down and slide out from under the bundles; when the operator will depress the tread, n, again throwing the connection, y, by the center, n', which will lock the carrier in position and hold it there until a number of bundles have again accumulated, when the operation is repeated.

An examination of the action of my improved harvesting machine will show that it is sure to bind the bundle no matter if the grain is heavy and has unduly increased its size, that as soon as the bundle is bound, it is engaged by my improved separating and bundle discharging device and the instant the binding mechanism starts to bind the next bundle, my improved separating and discharging arm, or rake, C, carries the last bundle bound, with a powerful sweep, to one side over the platform, G, and drops it off at the end into a bundle carrier, which is easily operated by the foot of the driver. Thus each bundle is made separate.

I believe that I have simplified my invention to the last degree possible and have it do the work. I have used no more parts than are really necessary to make the machine effective to the result.

My improved self binding harvesting machine is capable of great variation in the details of its construction without departing from my invention.

Having thus described my invention, what I claim as new, and desire to secure by Letters Patent, is—

1. In a low-down harvesting machine, the combination of the main frame, A, of the rearwardly projecting bracket, B, bearing the laterally projecting plate, F; the forwardly projecting sweeping, separating, discharging arm, C, connected by a ball, e, at its rear end in a socket in the bracket, B; a vertical shaft, E, in a suitable bearing at the end of the plate, F, connected by suitable gear to the knotter cam shaft of the binder mechanism; a crank, E', at the upper end of said shaft, E; a ball, b, at the end of said crank, E', with cam slot, C', adapted to actuate the sweeping arm, C, and the elevating springs, R, R, on the binding deck to act in conjunction with the said sweeping, separating arm, C, and its actuating mechanism, all substantially as described for the purpose specified.

2. In a low-down harvesting machine, the combination of the main frame, A; the rearwardly projecting bracket, B, bearing the laterally projecting plate, F; the forwardly projecting sweeping, separating and discharging arm, C, connected by a ball, e, at its rear end in a socket in the bracket, B; a vertical shaft, E, in a suitable bearing in the end of the plate, F, connected by a suitable gear to the knotter cam shaft on the binder mechanism; a crank, E', at the upper end of the shaft, E; a ball, b, at the end of said crank, E', adapted to actuate the sweeping arm, C, by moving in the cam guide-way, C', on the under side of arm, C, to separate the bundle from the unbound grain in the machine and discharge it, substantially as described for the purpose specified.

3. In a low-down harvesting machine, the combination of the main frame, A; of the rearwardly projecting bracket, B; a sweeping arm, C, pivoted by a ball and socket joint to the rear of said bracket, B; a cam groove on the under side of said arm; a crank below said sweeping arm to move said sweeping arm, C; and actuating mechanism for said crank connected to the knotted cam shaft of the binder mechanism to be actuated at the same time as the binding mechanism so as to pull the bound bundle away from the unbound grain in the binder, for the purpose specified.

4. In a self binding harvester, the combination with the binding mechanism, of a sweep rake to engage the bundles and pull them away from the unbound grain; a shaft, D, connected by a universal joint to the knotter cam shaft; a shaft, E, connected by miter gears to said shaft, D; a crank on said shaft, E; a cam slot in said rake to engage said crank, for the purpose specified.

5. In a self binding harvesting machine, the combination of a sweep rake pivoted to said machine; a binding deck; arms below said binding deck to raise the bundles out of the binding deck as soon as bound so that they shall be engaged by the rake; a platform adjacent to said binding deck to receive said bundles when they are swept to one side by the sweep rake, and the bundle carrier to the rear of said platform, for the purpose specified.

6. In a self binding harvester, the combination of a sweep rake pivoted to said machine to engage the bound bundle and pull it away from the unbound grain in the machine; a cam, $C'$, on the under side of said arm; a vertical shaft, $E$, a crank at the top of said shaft; a ball, $b$, at the top of the crank pin; and connections for the shaft, $E$, to the driving gear of the machine, for the purpose specified.

7. In a self binding harvester, the combination of a sweep rake pivoted by a ball, $c$, to the machine frame; a cam groove, $C'$, on the under side of said sweep rake; a crank, $E'$, with ball, $b$, to engage said cam groove, $C'$, and suitable connections with the driving mechanism of the machine to actuate said crank to operate the sweep rake to pull the bound bundles away from the unbound grain in the binder and discharge the same, for the purpose specified.

8. In a low-down self binding harvester, the combination of a binder mechanism, positioned to bind the bundle while lying in the direction of travel of the machine; a platform adjacent thereto to support and guide the bundles; a sweep rake to engage said bundles as soon as bound and carry them along said platform to the rear of the machine where they are discharged, for the purpose specified.

9. In a self binding harvester, the combination with the binder mechanism, of arms located beneath the bundles in the binder mechanism to lift the bundle out as soon as bound; a sweep rake to engage said bundles as soon as raised by said arms to swing the bundle to one side and discharge the same, for the purpose specified.

10. In a self binding harvester, the combination with a binding mechanism, of arms to raise the bundles out of the binding deck as soon as bound; a platform to support and guide said bundles from the binder deck; a sweep rake to engage said bundles as soon as raised from the binder deck to carry them along said platform and discharge them to the rear of the machine.

11. In a self binding harvester, the combination of the binder mechanism; a curved platform to convey said bundles from said binder mechanism; a sweep rake to engage the bundles as soon as bound and carry them along the platform; and a bundle carrier to the rear of said machine to receive said bundles, as specified.

In witness whereof I have hereunto set my hand and seal in the presence of two witnesses.

THOMAS WELCH. [L. S.]

Witnesses:
A. D. HARRIS,
WALTER S. WOOD.